United States Patent
Andersson et al.

[19]

[11] Patent Number: 6,163,544
[45] Date of Patent: Dec. 19, 2000

[54] CONFIGURATION METHOD FOR AUXILIARY RESOURCES

[75] Inventors: Staffan Andersson, Lessebovägen; Lars Kent Konradsson, Angsbergsvägen, both of Sweden

[73] Assignee: Telefonaktiebolaget LM Ericsson, Stockholm, Sweden

[21] Appl. No.: 09/093,075

[22] Filed: Jun. 8, 1998

Related U.S. Application Data

[63] Continuation of application No. PCT/SE96/01611, Dec. 6, 1996.

[30] Foreign Application Priority Data

Dec. 8, 1995 [SE] Sweden ................................. 9504395

[51] Int. Cl.⁷ ................................................. H04L 12/403
[52] U.S. Cl. ........................ 370/422; 370/457; 709/220; 709/226
[58] Field of Search .................................. 370/254, 249, 370/398, 422, 449, 457; 709/220, 226; 714/30; 700/17

[56] References Cited

U.S. PATENT DOCUMENTS

| | | | |
|---|---|---|---|
| 5,220,560 | 6/1993 | Ogasawara | 370/466 |
| 5,608,720 | 3/1997 | Biegel et al. | 370/249 |
| 5,812,394 | 9/1998 | Lewis et al. | 700/17 |
| 6,032,268 | 2/2000 | Swoboda et al. | 714/30 |

FOREIGN PATENT DOCUMENTS

| | | |
|---|---|---|
| 0 658 062 | 6/1995 | European Pat. Off. . |
| 96/08931 | 3/1996 | WIPO . |

OTHER PUBLICATIONS

ITU International Telecommunication Union, CCITT Recommendation, M 3100 (Oct. 1992), Generic Network Information Model, pp. 1–27, figures 2,3,5.

ITU International Telecommunication Union, CCITT Recommendation, X.722 (Geneva, 1992), Data Communication Networks: Information Technology—Open Systems Interconnection–Structure of Management Information: Guidelines for the Definition of Managed Objects.

ITU International Telecommunication Union, CCITT Recommendation, X.722—Corrigendum 1 (ITU–T, Oct. 1996), Series X: Data Networks and Open System Communication, OSI Management: Information Technology—Open Systems Interconnection—Structure of Management Information: Guidelines for the Definition of Managed Objects, Technical Corrigendum 1.

(List continued on next page.)

*Primary Examiner*—Hassan Kizou
*Assistant Examiner*—John Pezzlo
*Attorney, Agent, or Firm*—Burns, Doane, Swecker & Mathis, L.L.P.

[57] ABSTRACT

A generic information model for configuration, control and management of auxiliary resources within a telecommunication network. The information mode comprises a hierarchical structure of objects classes: a network object class, a managed element class, and a fabric object class. The network object class represents the telecommunication network. The managed element object class describes the physical sites of fabric within the telecommunication network. The fabric object class describes the physical exchanges used for switching in the telecommunication network, as well as devices connected to individual exchanges. The information model is applied to a switched telecommunication network to provide an auxiliary resource pool class and an auxiliary resource connection termination point object class to allow for dynamic handling of auxiliary resources within the switched network. Centralized handling of the auxiliary resources is also completed by the invention.

3 Claims, 6 Drawing Sheets

OTHER PUBLICATIONS

ITU International Telecommunication Union, ITU–T G774.03 (ITU–T, Nov. 1994), General Aspects of Digital Transmission Systems; Synchronous Digital Hierarchy (SDH) Management of Multiplex–section Protection for the Network Element View.

ITU International Telecommunication Union, ITU–T G774.07 (ITU–T, Nov. 1996) Series G: Transmission systems and Media, Digital Systems and Networks: Digital Transmission Systems—Terminal equipments—Operations, administration and maintenance features of transmission equipment; Synchronous Digital Hierarchy (SDH) management of lower order path trace and interface labelling for the network element view.

ITU International Telecommunication Union, ITU–T G774 (ITU–T, Sep. 1992) General Aspects of Digital Transmission Systems; Terminal equipments Synchronous Digital Hierarchy (SDH) management Information Model For the Network Element View.

ITU International Telecommunication Union, ITU–T G774 Corrigendum 1 (ITU–T, Nov. 1996). Series G: Transmission Systems and Media, Digital Systems and Networks: Digital Transmission Systems—Terminal equipments—Operations, administration and maintenance features of transmission equipment; Synchronous Digital Hierarchy (SDH) management information model for the network element view. Corrigendum 1.

ITU International Telecommunication Union, ITU–T G774.02 (ITU–T, Nov. 1994), General Aspects of Digital Transmission Systems: Synchronous Digital Hierarchy (SDH) Configuration of the Payload Structure For the Network Element View.

ITU International Telecommunication Union, ITU–T G774.02 Corrigendum 1 (ITU–T, Nov. 1996). Series G: Transmission Systems and Media, Digital Systems and Networks: Digital Transmission systems—Terminal equipments—Operations, administration and maintenance features of transmission equipment; Synchronous Digital Hierarchy (SDH) configuration of the payload structure for the network element view. Corrigendum 1.

ITU International Telecommunication Union, ITU–T G774.04 (ITU–T, Jul. 1995) General Aspects of Digital Transmission Systems: Synchronous Digital Hierarchy (SDH) Management of the Subnetwork Connection Protection for the Network Element View.

ITU International Telecommunication Union, ITU–T G774.05 (ITU–T, Jul. 1995) General Aspects of Digital Transmission Systems: Synchronous Digital Hierarchy (SDH) Management of Connection Supervision Functionality (HCS/LCS) for the Network Element View.

ITU International Telecommunication Union, ITU–T G774.05 Corrigendum 1 (ITU–T, Nov. 1996). Series G: Transmission Systems and Media, Digital Systems and Networks: Digital Transmission systems—Terminal equipments—Operations, administration and maintenance features of transmission equipment; Synchronous Digital Hierarchy (SDH) management of connection supervision functionality (HCS/LCS)for the network element view.Corrigendum 1.

ITU International Telecommunication Union, ITU–T G774.6 (ITU–T, Apr. 1997). Series G: Transmission Systems and Media, Digital Systems and Networks: Digital Transmission systems—Terminal equipments—Operations, administration and maintenance features of transmission equipment; Synchronous Digital Hierarchy (SDH) unidirectional performance monitoring for the network element view.

ITU International Telecommunication Union, ITU–T G774.8 (ITU–T, Apr. 1997). Series G: Transmission Systems and Media, Digital Systems and Networks: Digital Transmission systems—Terminal equipments—Operations administration and maintenance features of transmission equipment; Synchronous Digital Hierarchy (SDH) management of radio–relay systems for the network element view.

CONFIGURATION METHOD FOR AUXILIARY RESOURCES

This application claims priority under 35 U.S.C. §§119 and/or 365 to SE 9504395-6 filed in Sweden on Dec. 8, 1995; the entire content of which is hereby incorporated by reference.

This application is a continuation application of International Application No. PCT/SE96/01611, filed Dec. 6 1996, which designates the United States.

Prior art telecommunication system models are generally structured in the manner shown in FIG. 1. System hardware, such as communication processors, switching equipment form a hardware layer 1. An operative system 2 comprising a core 3 of basic functions for controlling the communication and a shell 4 of other general operative system functions forms together with the hardware layer 1, a platform 5 on which an application 6, such as POTS (plain old telephony system) executes. The application 6 is written in a high level language, such as C++, PLEX, Smalltalk. A number of different interfaces, collectively shown by small circles 7, exist between the operative system 2 and the hardware layer 1. Similarly there is another number of different interfaces, collectively shown at 8, between the application 6 and the platform 5.

Auxiliary resources, such as echo suppressors, voice prompting devices, tone transmitters, conference bridges and announcement machines are hardware which belong to the hardware layer 1 in the system model. Control and handling of auxiliary resource hardware is closely related to the platform. This presents a problem when for example an existing echo suppressors, implemented in one technique, is replaced with a new one which implemented in another technique. Generally the new one will use an interface which is different from the existing one. This implies that the interface need to be redefined and that the code used at the implementation layer 3 need to be rewritten in order to reflect the new interface. This requires much work.

In the prior art it is not unusual that each type of auxiliary resource has its own interface. This means that the above drawback will encounter for each type of auxiliary resource.

Also, when the platform 5 is changed, for example in consequence of the development of new semiconductor technologies which it is desired to implement in hardware devices in the telecommunication network, the handling of the auxiliary resources needs to be changed. This requires much work in redefining existing interfaces and redesigning the code for the redefined interfaces.

A network operator operates networks. He may or may not own the networks he is operating. With operation is meant traffic supervision, traffic control, fault detection, fault repair, billing and many other tasks, all aiming at providing the network customers, i.e. the subscribers, with connections that are set up quickly, that are stable and error-free once set up and that are released quickly. To his help for achieving this the network operator creates network descriptions which gives the operator a management view of his network. The management view may be a graphic representation of the network showing the local exchanges, the physical lines extending between the local exchanges, the traffic load on the physical lines, the state of the network elements (local exchanges and physical lines) i.e. whether they are fully operative or have a faulty parts and many other things. Further to the graphic representation the management view comprise information stored in a data base and print outs of information relating to the network and its subscribers. With the aid of an operation and support system, referred to as OSS, which interacts with the network descriptions the network operator can, from within the OSS, supervise the network's traffic, perform corrective actions and, in modern OSS:s, set up cross connections which are a kind of long term permanent connections of inter-exchange lines. From within the OSS the network operator may manage network elements in a uniform manner dictated by the standards, such as the CCITT X.722 standard. The OSS cannot be used for setting up on demand connections.

An on demand connection is set up by a subscriber by digit dialing on an access unit, such as a telephone instrument. The digits are signaled, over the access network, to a local exchange. In response to the reception of the digits at the local station and following digit analyses various programs within the application 6 will start to interact with the platform 6 in order to set up the requested connection. The platform's shell of operative system functions, referred to as an operation system is not to be confused with an OSS. When the connection is set up it will seize network resources and, sometimes, also auxiliary resources must be seized in order to guarantee a stable, high quality connection.

Future trends in telecommunication indicate that a network operator must be able to set up special types of demand connections, such as for example so called semi-permanent connections, virtual leased line connections and others. To day the network operator sets up such connections by manually connecting physical entities, such as inter-office trunk lines, to specific switch ports. The procedure is time consuming, expensive and has a long lead time counted from the time a customer orders such a connection and to time the connection actually is set up.

The CCITT M.3100 standard is a generic information model which is used to specialize a transport network information model such as a SDH transport network (synchronous digital hierarchy) and a SONET transport network. Cf. the CCITT G.774 standard which is a specialization of the CCITT M.3100 standard. It is also used for establishment of cross connections, termination of transport links and fault managements in a transport network. The transport network is the network between local switch offices and does not include the access network, which is the network between subscribers and their respective local switch offices.

The CCITT M.3100 standard describes resources of a transport network as managed objects (MO:s) within the transport network. The resources of the transport network are divided into specific fragments. Examples of managed objects are switch fabrics, links, termination point pools (Tp-pools). Examples of fragments are cross connection fragment, termination point fragment.

The CCITT M.3100 standard does not comprise any managed objects for auxiliary resources. The reason for this is that is has not been foreseen that auxiliary resources must be handled within the transport network.

Network elements in the transport network are configured, controlled and managed using the standardized Q3 interface. The Q3 interface is used also for configuration of networks. The Q3 interface cannot be used for control and management of auxiliary resources.

Another drawback associated with management of auxiliary resources relates to the manner in which the auxiliary resources is described in the information model of the telecommunication system. In particular the exact position of each individual auxiliary resource in the telecommunication network must be known by an application. In fact, the individual positions of each one of the individual auxiliary resources are hard coded in the system platform. An application which needs to use an auxiliary resource, such as an echo suppressor, needs to address a particular echo suppressor. Is the addressed echo suppressor already seized, the application must search for another echo suppressor. Seen from an overall network perspective available echo suppressor will thus not be used efficiently. Moreover, it may take long time until a free echo suppressor is found. This in its turn means that it may take unacceptable long time to set up the connection for which the echo suppressor was needed.

DESCRIPTION OF THE INVENTION

An object of the invention is to provide a method for handling auxiliary resources in a telecommunication network in a uniform, system independent manner.

Another object of the invention is to provide a method for handling auxiliary resources in a telecommunication network allowing for reuse of software, which is related to modeling and control of auxiliary resources, in case the technology used for their implementation is changed.

Still another object of the invention is to provide a method for configuration, control and management of auxiliary resources in a telecommunication network from within an operation and support system.

Another object of the invention is to allow a network operator to set up connections, in particular connections that require the use of auxiliary resources, from within an OSS, using a standardized information model which describe the physical resources of the network in a uniform way.

Still another object of the invention is to allow for a centralized management of auxiliary resources. All auxiliary resource of one and the same kind are grouped into a pool, irrespective of their physical sites in the telecommunication network.

Still another object of the invention is to make it possible for a network operator to handle and to describe auxiliary resources in a centralized manner. In particular it should be possible to select an individual auxiliary resource of a predefined kind from a central pool of auxiliary resources of said predefined kind without knowing the physical site of the pool in the telecommunication network.

The above objects are achieved by using standardized concepts for cross connections to create a new generic information model for auxiliary resources configuration, control and management. The new information model is particularly well suited for use in set up of conventional, subscriber initiated, on-demand connections which will need the use of an auxiliary resource.

The new information model describes auxiliary resources, control of auxiliary resources and management of auxiliary resources in terms similar to those used in the CCITT M.3100 and CCITT X.722 standards and will benefit from the over all general principles set by the standard. The language which implements the information model will thus be familiar to telecommunication network operators which will have no difficulty to provide their existing network descriptions with functions for configuring, control and management of auxiliary resources. As far as applicant knows this is a novel concept.

In accordance with the method of the present invention an application that needs an auxiliary resource of a particular kind requests an auxiliary device, in response to the request information is returned that indicates where in the network the pool comprising the requested auxiliary device is situated, the pool containing the requested auxiliary devices is analyzed, a free auxiliary device is immediately seized and is connected to the connection for which the resource was requested, an operation or a sequence of operations in the seized auxiliary device is initiated, and finally the seized auxiliary device is returned to the pool. In this manner the free auxiliary resources in said pool will be used efficiently and will be seized without undue time delay. Generally, the application need not to know the exact positions of the auxiliary resources.

Telecommunication network operators using the model according to the invention will thus be provided with a tool that will substantially shorten the lead times for introducing in their networks new types of auxiliary resources. This is so because the network operator, being familiar with a standardized methodology to create a tailor made network description, can use the same methodology to add such new auxiliary resources into his existing network description. As far as applicant knows this is a novel feature, since to day this work (to incorporate new kinds of auxiliary resources into a network description) has to be done by the system vendor.

Operation and support applications, supporting set up and release of such on demand connections, are built as a shell around an existing general information model. This will make the information model comprehensive to the network operator.

DETAILED DESCRIPTION OF THE INVENTION

Figure 1:
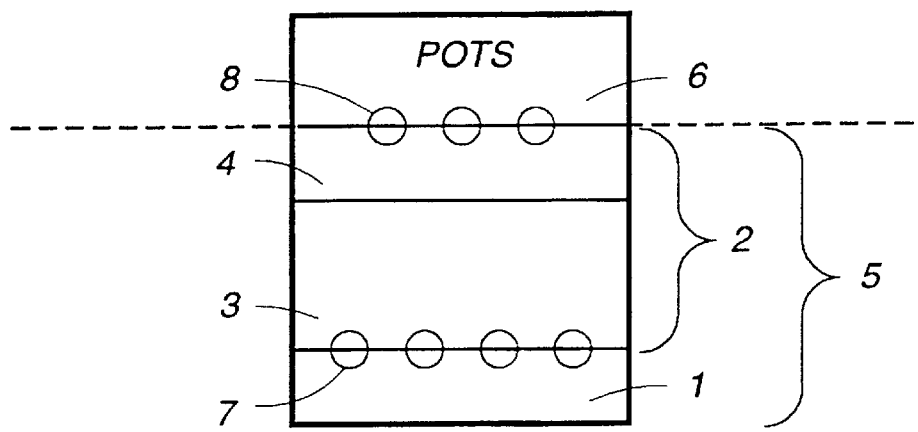
FIG. 1 is a block diagram of a telecom system architecture in accordance with prior art.
Figure 2:
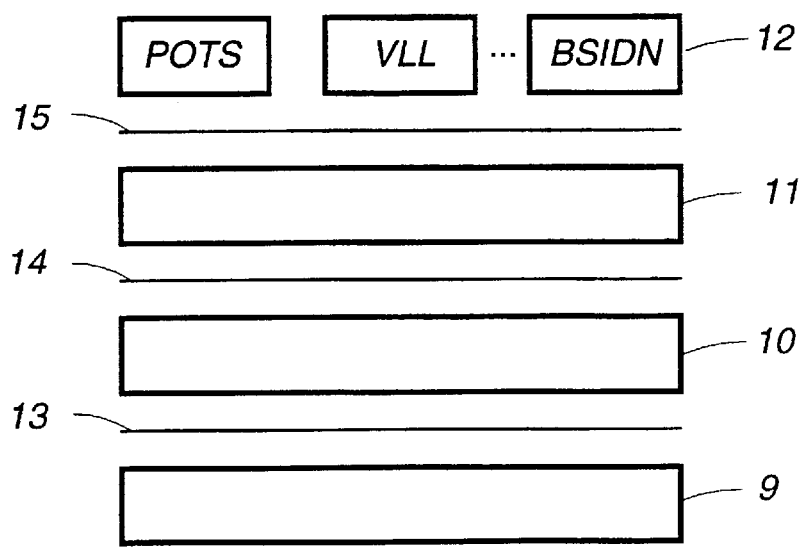
FIG. 2 is a block diagram of a modern telecom system architecture in which principles of the present invention are implemented.

In FIG. 2 the architecture of a modern telecom system is shown. The model in accordance with the present invention is based upon this architecture and therefore it will be described. The telecom system architecture is separated into four major layers; a system component layer 9, a core layer 10, an application platform 11 and an application layer 12.

Examples of applications are POTS, VLL (virtual leased lines), BISDN (broad band integrated-services digital network), GSM (Global System for Mobile communication)

each of which contains a set of services which are offered to an end user; a subscriber. Each one of the applications comprises application specific parts such as network access methods, network access equipment, subscriber access methods and subscriber access equipment. An example of a network access equipment is exchange terminals (ET:s), an example of subscriber access equipment is line interface circuits (LIC:s) for analogue connections and digital line interface circuits (DLIC:s) for digital connections.

The application layer 11 contains basic functions which may be utilized by all of the applications. This approach will reduce the number of functions per application and will enable the implementation of application modularity. It is thus possible to re-use a large portion of, or all of the designs, both hardware and software, for ISDN, GSM, POTS and future applications. Examples of basic functions available at the application platform layer are analyze functions for number and routing calculations as described in our PCT-application WO SE 95/01026, charging functions for tariffing, data collection and storage, connection handling functions for ordering various types of connections as requested by the various applications and signaling functions such as common channel signaling system No. 7, dual tone multi frequency (DTMF) signaling.

The core system layer 10 contains the operating system of the communication processors used in the telecom system. Typically the operating system supports various functions for execution, communication, data storage, and operation and maintenance (OSS). Further, the core system layer 10 comprises a number of control and data transport functions which are re-used by different applications. This part of the architecture is assumed to be stable over a long period of time, whereas processors may be replace in pace with technological development.

The system component layer 9 comprises the hardware of the telecom system such as processors and switching equipment.

The different layers 9–12 are separated by fundamental interfaces 13, 14 and 15. A fundamental interface is a collective concept. A fundamental interface comprises a collection of a number of individual interfaces.

In telecom systems a transport network is distinguished from a switched network. A transport network is the infra structure that offers transport capacity of data. To-day a transport network does not offer any services. A typical example of a transport network is a SDH-network (synchronous digital hierarchy).

Recently some network operators have expressed their interest in a transport network that offers services. Such services, if implemented in an existing transport network, would most certainly bring about handling, such as seizure and release, of auxiliary resources. Such handling would then be operator dependent. This is where the present invention comes in handy, since the model in accordance with the invention is familiar to an operator; it is similar to the standardized one he uses for the conventional operation and support of his network. Such conventional operation and support activities include notifying the operator of faults that occur in the switching equipment, configuration of logical sub-nets and reconfiguration of existing networks in connection with expansion and contraction of the existing physical network.

A switched network, also referred to as a service network, is a network that receives, from its subscribers, connection requests. In a switched network software residing in the application will send the connection requests to connection handling software that will seize, and release, the resources needed for setting up the requested connection. The model in accordance with the present invention is used in a switched network to handle, seize and release, auxiliary resources.

It is believed to be a novel concept that one and the same model can be used both for switched networks and transport networks.

Figure 3:
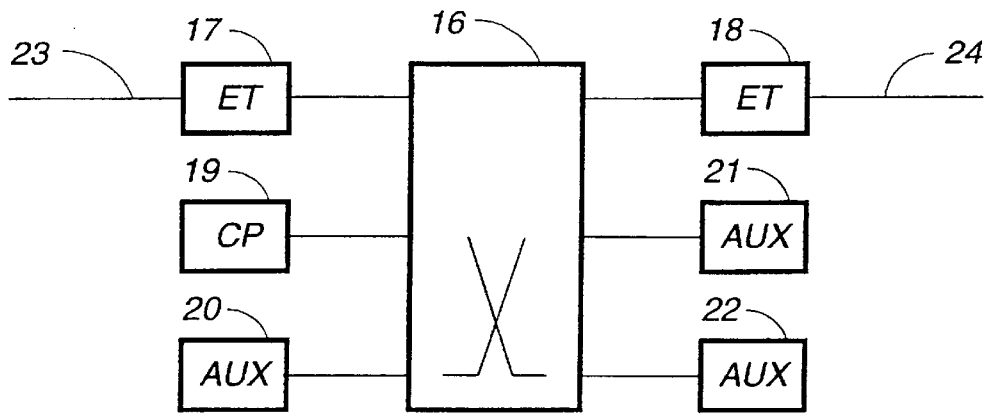
FIG. 3 is a block diagram of an exchange provided with different types of auxiliary devices

FIG. 3 is a block diagram showing an exchange 16, two exchange terminals (ET:s) 17, 18, a central processor 19 and auxiliary devices 20, 21, 22. Each exchange terminal is connected between the exchange 16 and a respective external line 23 and 24 respectively. As an example auxiliary device 21 is an echo suppressor, auxiliary device 22 is a conference equipment and auxiliary device 23 is a voice prompting equipment. The units shown in FIG. 3 is an example of a typical physical configuration. Note that the auxiliary devices 20, 21 and 22 are shown to be physically connected to the exchange.

In order to minimize implementation aspects of the auxiliary devices an abstract model of the auxiliary devices is proposed. The abstract model based on the managed objects TP Pool (Termination Point pool), CTP (Connection Termination Point), Fabric and Managed Element, all described in CCITT M.3100 Generic Network Information Model, is designed and is shown in FIG. 4.

Figure 4:
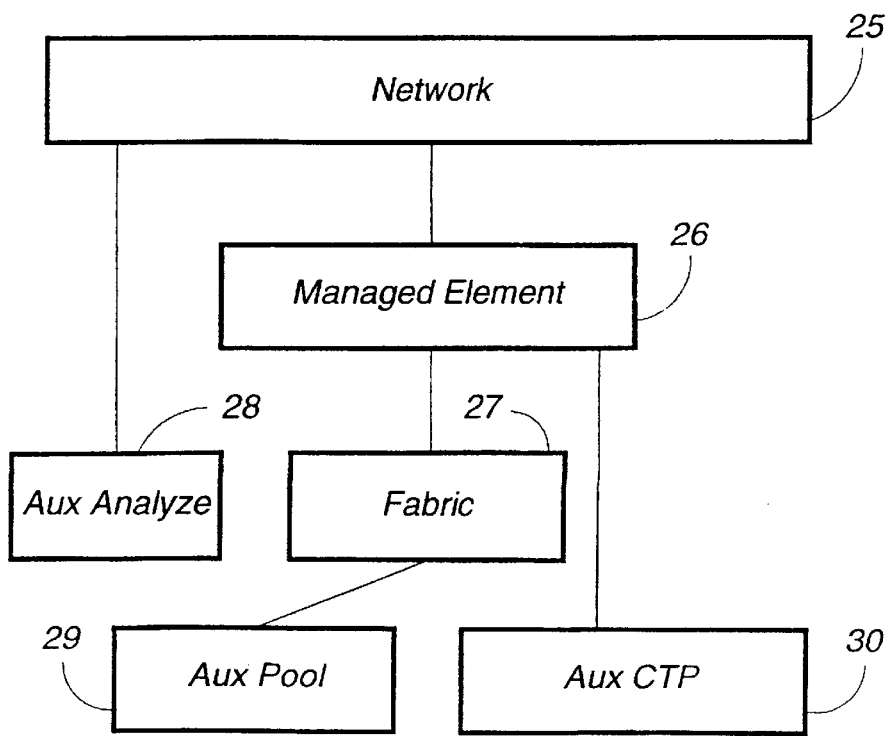
FIG. 4 is an information model of a telecommunication network in accordance with the present invention.

The abstract model in FIG. 4 is described in terms of object classes using terminology and definitions from CCITT X.722. The model comprises a network object class 25, a managed element object class 26, a fabric object class 27, an auxiliary resource analyze object class 28, an auxiliary resource pool object class 29 and an auxiliary resource CTP class 30 (CTP is defined in the previous paragraph). An object class is an aggregate of named data elements and a set of operations designed to manipulate said data. An object class may be thought of as a template used to create individual objects. The network object 25 is an object class representing an abstraction of a telecommunication network_and comprises an identification of the telecommunication network. The managed element object class 26 is an abstraction of a physical site of a switch in the telecommunication network, for example the site, in the telecommunication network, of the switch shown in FIG. 3. The managed element object class has a relation to the networkobject class as symbolized by the vertical line between boxes 25 and 26 in FIG. 4. The fabric object class 27 is an abstraction of a switch, for example the switch 16 shown in FIG. 3. The fabric object class describe the physical switches used for switching in the telecommunication network as well as devices connected thereto as shown in FIG. 3. The fabric object class has a relation to the managed element object class as symbolized by the vertical line between boxes 26 and 27. The auxiliary resource analyze object class 28 is used to support centralized handling of auxiliary resources in the telecommunication network. This will be described further down. The auxiliary resource analyze object class comprises information describing the sites within the telecommunication network where there are pools of auxiliary devices and it has a relation to the network object class. This relation is symbolized by the vertical line between boxes 25 and 28. The auxiliary resource pool object class 29 is an abstract object class used only for inheritance. It contains one or several auxiliary device CTP:s and it represents a specific type of auxiliary service. The auxiliary resource pool object class has a relation to the fabric object class, it comprises identities of specific auxiliary devices and it contains connection termination points of the auxiliary devices. The auxiliary resource CTP object class 30 is an abstract object class used for inheritance only. It represents auxiliary devices and contains information on the auxiliary device. Examples of information are state information (such as seized or free, busy or not busy),address information, identity information and capability information. The auxiliary resource CTP object class has a relation to the managed element object class 26, it contains information on identified auxiliary devices and operates on identified auxiliary devices. The relation is symbolized by a vertical line between boxes 26 and 30.

The auxiliary resource analyze object class 28 and the auxiliary resource pool object class 29 are independent of the physical platform 5. The auxiliary resource pool object class 29 is independent of the physical realization of the auxiliary devices and comprises the identity of an auxiliary device and a logical address to the non shown memory wherein it is stored. The auxiliary resource pool object class has a relation to the fabric object class 27 and contains connection termination points of the auxiliary devices. The auxiliary resource CTP object class has a relation to the managed element object class, comprises specific information of an identified auxiliary device and is used to operate on identified auxiliary devices.

Figure 5:
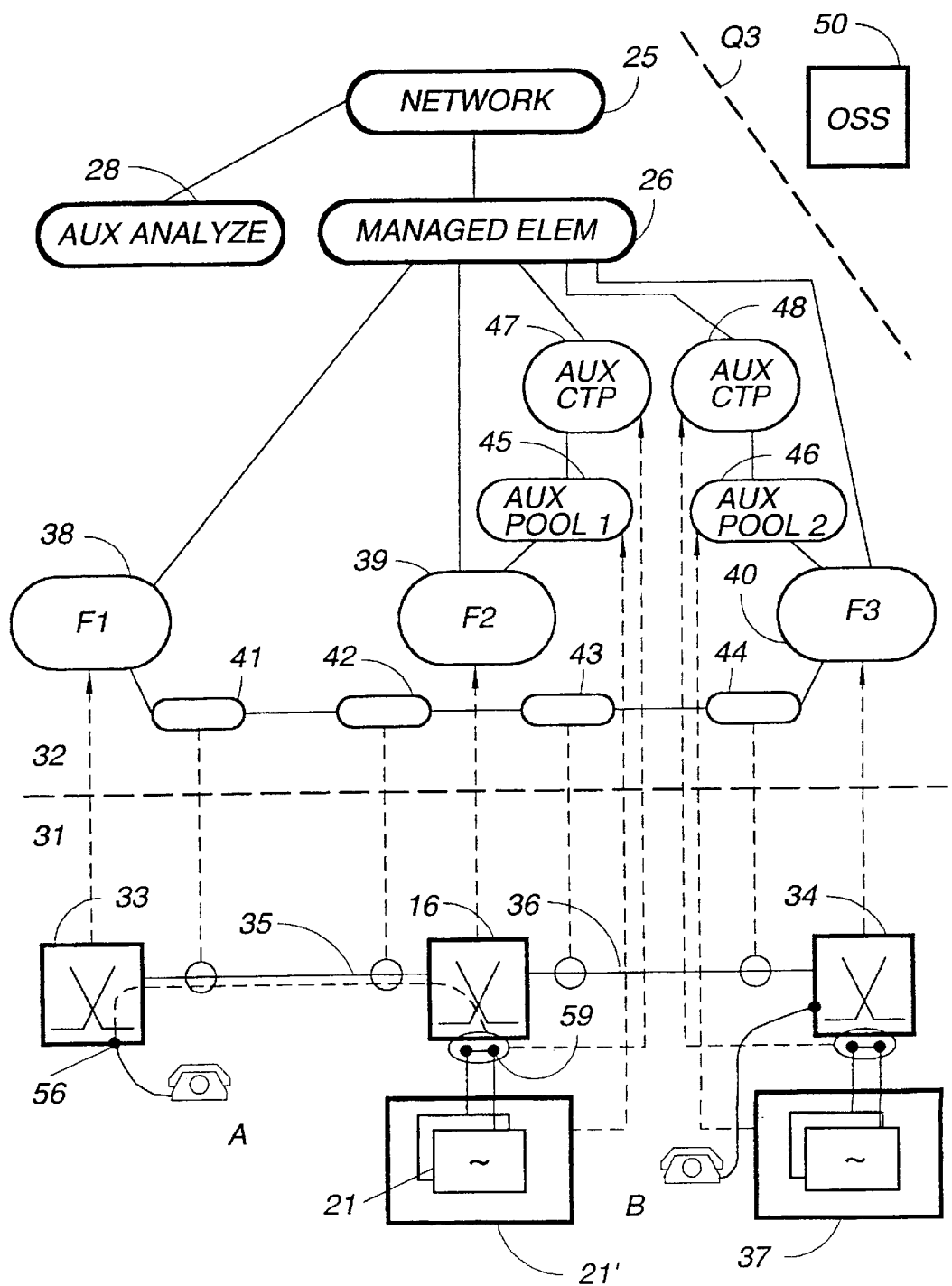
FIG. 5 is a block diagram of a simplified physical telecommunication network and a logical network modeled in accordance with the principles of the present invention to reflect the physical network, FIG. 6 are tables that illustrate the method used to localize, seize and connect an auxiliary device in accordance with the invention.

In FIG. 5 there is shown a physical layer 31 and a logical layer 32. The resources of the physical network, such as switches, trunks, links and time slots in links, auxiliary devices, are shared among a number of logical networks. Each logical network is operated by an operator. There may be different operators for different logical networks. A logical network is a picture of the portions of the physical network allocated to the individual logical network.

The physical network comprises three switches 33, 16 and 34 interconnected with physical links 35, 36. The switches are geographically separated. Several tone sender 21 are connected to connected to switch 16 and together for a first tone sender pool 21'. Similarly there is a second tone sender pool 37 comprising tone senders connected to switch 34. A and B are subscribers having a respective telephone instrument.

The logical network 32 comprises a network object 25, a managed element object 26 which manages fabrics 38, 39, 40. A fabric is a logical abstraction of a switch; fabric 38 being the image of switch 33, fabric 39 being the image of switch 16 and fabric 40 the image of switch 34. Termination point pools 41, 42 is the logical abstraction of the link 35 and interconnects fabrics 38 and 39. Similarly Tp-pools 43, 44, representing link 36, interconnect fabric 39 with fabric 40. Auxiliary resource pool objects 45, 46 are logical abstractions of tone sender pools 21' and 37 respectively. These auxiliary resource pool objects 45, 46 correspond to the auxiliary resource pool object 29 of FIG. 4. Auxiliary resource CTP objects 47, 48 represent the termination points of the tone sender pools 21 and 37 respectively. In the physical layer the termination points of the pools are indicated by the filled circles at the periphery of the exchange symbols. The auxiliary resource CTP object 47 has a relation to its auxiliary resource pool object 45. Similarly the auxiliary resource CTP object 47 has a relation to its auxiliary resource pool object 46. Pool object 45 has a relation to fabric 39 and pool object 46 has a relation to and fabric 40. Each fabric 38, 39 and 40 has a respective relation to managed element 26. Each auxiliary resource CTp object 47 and 48 has also a respective relation to managed element 26. Managed object 26 has a relation to network object 25. The auxiliary resource analyze object 28 has a relation to managed element 26.

The logical network 32 is configured by an operator, not shown, which for this purpose uses an operation and support system 50. The operation and support system 50 is used for conventional operation and support and has in accordance with the present invention been extended with a generic information model in accordance with CCITT M.3100 to which there has been added the auxiliary resource fragments 45, 46, 47 and 48. As described above the generic information model CCITT M.3100 is conventionally used to setting up cross connection between fabrics within the transport network. With the present invention it will now be possible for a network operator to configure auxiliary resource objects in the auxiliary resource fragment by inputting information about the auxiliary resources into the auxiliary resource objects. An application will then use the auxiliary resource objects in run time. For example an application may request an auxiliary resource to be connected to a connection that the application sets up in the transport network. This is in contrast to the technique used to-day. To-day auxiliary resources used by an application are hard coded in the application software. Should new auxiliary devices, for example produced in new technologies, replace the existing auxiliary devices the application software must be re-coded. Such re-coding requires much work, detailed knowledge of the system on which the application runs, and requires much time. With the present invention the very intimate connection between the application and the auxiliary resources found in the application software is untied. If existing auxiliary resources are to be replaced this will have no impact on the application software. Only the resource objects need to be changed. As an additional advantage with the invention it will be possible to install into the transport network new types of auxiliary devices resource, unknown to-day, using the auxiliary resource fragment in accordance with the invention. Such new types resources will then be possible to connect to connections which are set-up by an operator.

An example of setting up an on-demand connection between subscribers A and B will be described next with reference to FIGS. 6, 7 and 8. Suppose subscriber A wants to talk with subscriber B. A lifts his receiver. This is detected in a line interface circuit in switch 33. Subscriber A now waits a ring tone in his received before he start dialing the B-number. A tone sender should now be connected to A:s line. There is no tone sender in switch 33 and therefore software in the application, POTS, requests connection of a tone sender to A:s line. The software sending out this request is schematically shown at 51 in FIG. 6. The request together with the identity of the switch in which the call originates is sent to auxiliary resource analyze object 28. The auxiliary resource analyze object 28 typically comprises a table comprising a number of input entries corresponding to the respective identities of the fabrics in which calls are originated and in which there are no tone senders present. To each input entry there is associated data pointing out for each possible destination switch the tone sender pool to be used for the particular destination switch. Tone sender pools to be used in the alternative may also be associated with an input entry. In the example given auxiliary resource pool 45 (named P1 in the table) resident in fabric 39 (named F1 in the table) should be used in the first alternative. If all tone senders in this pool P1 are occupied then the auxiliary resource pool 37 (named P2 in the table) in fabric 40 (named F3 in the table) should be used in the second alternative.

It should be noted that all tone sender pools 21', 37 of the logical network have been grouped together in the central auxiliary resource analyze object class 28. This auxiliary resource analyze object class 28 will thus be independent of the physical realization of the telecommunication network.

The auxiliary resource object 28 communicates the two alternatives to the application software 51 as indicated by arrow 53. For the sake of clearness the abbreviations for the input and output data in auxiliary resource analyze object 28 refer to the corresponding abbreviations within the symbols used for the objects in FIG. 5.

Accordingly, the software 51 will now know where a tone sender can be found in the network. Next the software must seize a tone sender. To do so a seizure request, represented by arrow 54, is sent to the auxiliary resource pool object 29 which comprises a list of ideal tone senders. In the example it is assumed that there is a free tone sender and this will now be seized by the software 51. Once the tone sender has been seized it will be deleted from the list in the auxiliary list pool object 29. The idle list comprises, for each tone sender of the pool the tone sender identity and its termination point. Generally speaking a termination point is a logical address to an auxiliary device. There is a relation between the logical address and the point in the physical network at which the auxiliary device is connected. In case of the auxiliary device is a tone sender the logical address has a relation to a physical switch port. When a tone sender has been successfully seized this is communicated to the software 51 together with the termination point of the seized tone sender. This communication is symbolically shown by arrow 55.

Finally the application software 51 orders set up of connection between subscriber A's termination point 56, this termination point being fetched from the subscriber data of subscriber A, and the connection termination point 59 of the tone sender in the seized tone sender. This connection termination point CTp=59 is fetched from the idle list which comprises the individual identities of the tone senders and their associated connection termination points CTp. The order to set up this connection is indicated by arrow 57 and is performed by separate application software 58. There has now been established a connection between the termination points 56 and 59 shown in FIG. 6, said connection being indicated by a broken line. Next the tone sender sends a ring tone to subscriber A thus prompting him to dial the B-number.

Next the application software 51 will set up a connection to switch 34, the switch to which B is connected. Subscriber B may either be busy or will not answer or has a call forwarding service activated. If B is busy the application software shall instruct the tone sender to send a busy tone to subscriber A. If B does not answer the call the tone sender should send ring tones to A at regular intervals. If B has activated a call forwarding service then the application software may for example request a voice prompting machine to send a message to subscriber A, this message for example being "please wait while the call is transferred". Should a voice prompting machine be connected then the same procedure as indicated above is applied with reference to a pool of voice prompting auxiliary devices.

Generally an auxiliary device is operated upon by sending messages to it, said messages being generated either by the application software 51 or by specific software.

Figure 7:
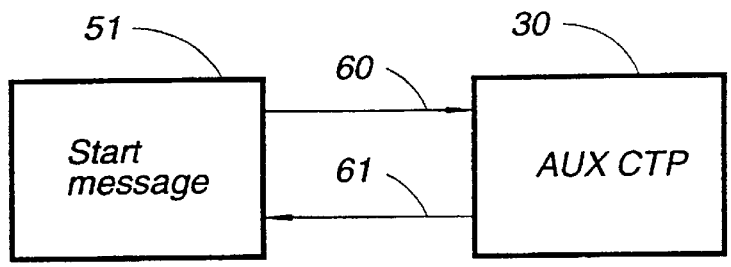
FIG. 7 is a block diagram illustrating initiation of an operation or of a sequence of operations in an seized auxiliary device by sending messages.
Figure 8:
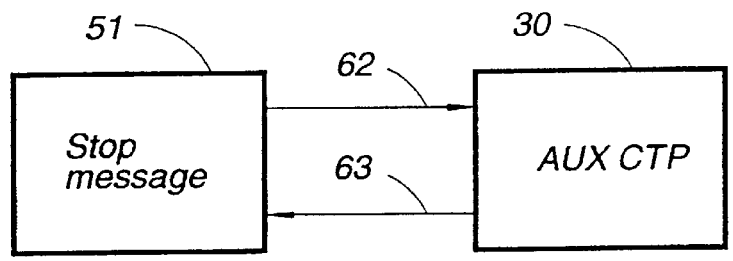
FIG. 8 is a block diagram illustrating the stopping of sending messages.

In FIG. 7 application software 51 sends a message to the above discussed seized tone sender by forwarding this message to the auxiliary resource CTP object 30 of the seized resource. This message is represented by arrow 60. The tone sender acknowledges the receipt of the message, arrow 61. It should be noted that the auxiliary device CTp class 30 is independent of the physical implementation of the auxiliary device; the tone sender in the example.

When a message should be stopped the application software 51 prepares a stop message and sends it to the auxiliary resource CTP object of the seized resource, in this case the tone sender. Once the tone sender has finished its job a stop message 63 is sent to the application software. This procedure has been illustrated in FIG. 8.

Figure 9:
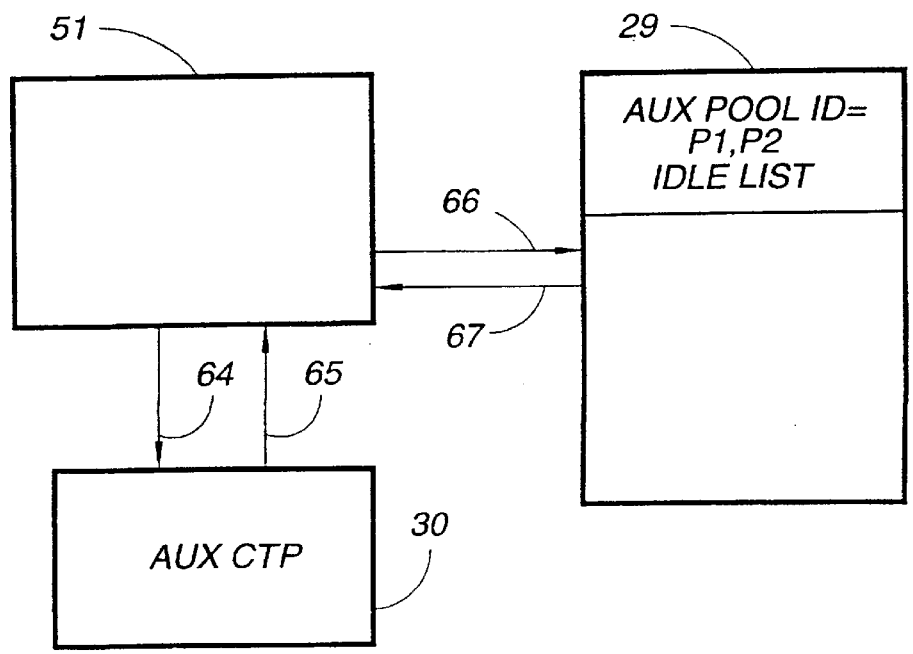
FIG. 9 is a block diagram illustrating how a seized auxiliary device is returned to its pool.

The procedure used to disconnect a seized resource is shown in FIG. 9. In the above example it is assumed that subscriber B lifts his receiver in response to the reception of the ring signals. Subscribers A and B start to talk to each other and the seized tone sender should be returned to the pool 21' so it can be used by other calls. The call between subscribers A and B still persists. The application software 51 sends a disconnect order to the auxiliary resource CTP object 30 and the connection between terminal points 58 and 59 is disconnected. The disconnect order is shown at arrow 64 and an acknowledgment 65 is set back to the application software 51. Next the application software 51 returns the seized tone sender to the pool 21' by sending a corresponding order to the auxiliary resource pool 29. In response to this order the seized tone sender is again entered into the idle list 29 of free auxiliary resources. An acknowledgement that the previously seized resource has been returned is sent to the application software 51, this acknowledgment being indicated by arrow 67.

Figure 6:
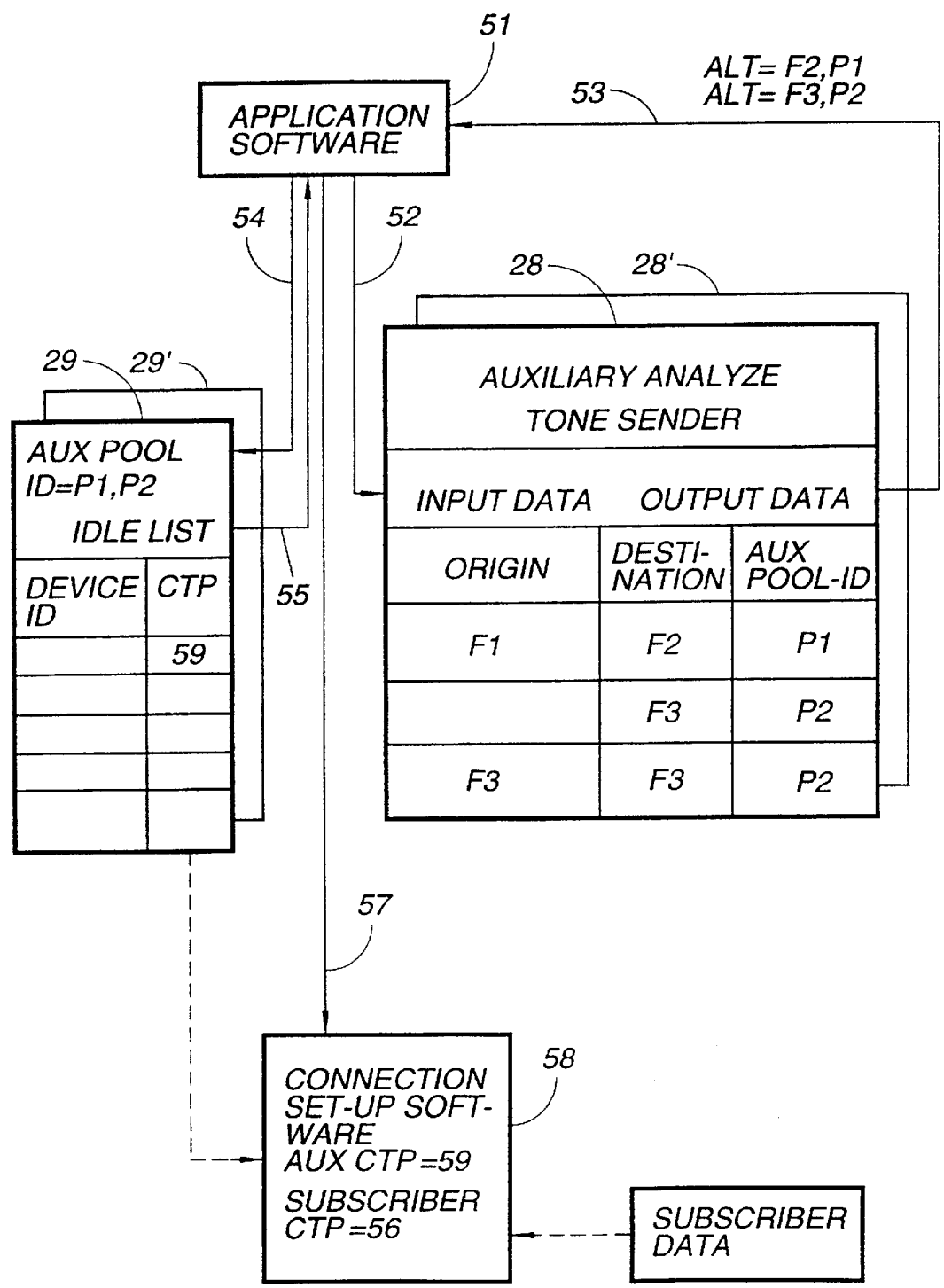

FIG. 6 is a simplified block diagram showing the software and objects involved in setting up a connection requiring a tone sender. Therefore only the objects concerned with handling of tone senders have been shown. Should for example a connection require the use of a conference equipment, then there is an auxiliary resource analyze object class 28' comprising all pools of conference equipments, an auxiliary resource pool object class 29' comprising a list of idle conference equipments and an auxiliary resource CTP object class 30 comprising the termination points of the conference equipments.

Figure 10:
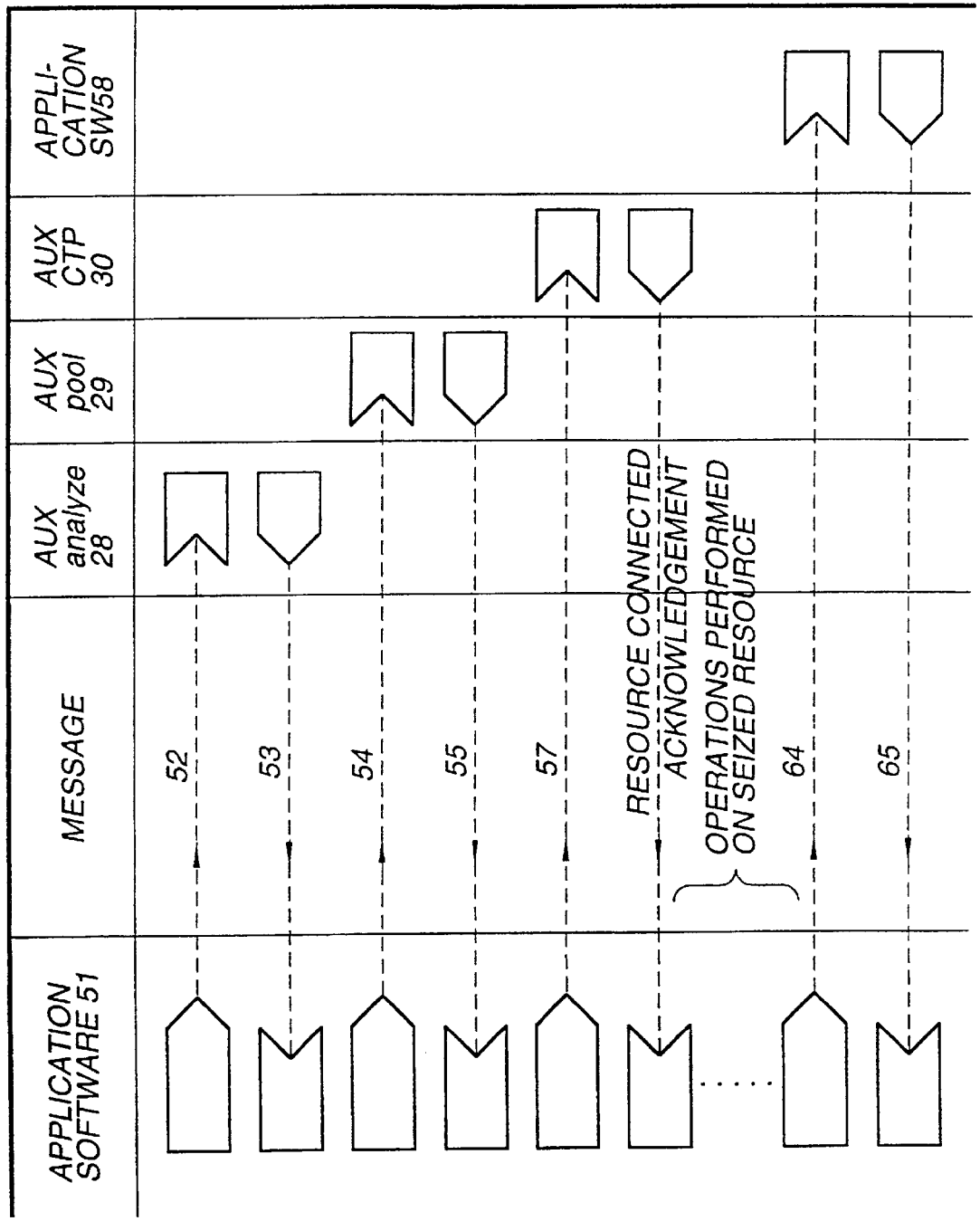
FIG. 10 is a flow diagram illustrating the operations shown in FIGS. 6–9.

In FIG. 10 the above described process steps are indicated in the form of a flow chart which illustrates the various objects concerned in the information exchange which are required to find an auxiliary resource in the network, seize a particular resource, operate the seized resource and finally return the seized resource to its pool. Although only one operation procedure has been described, i.e. tone sending an auxiliary device may perform many different producers, such as delivering different voice prompting messages.

In the enclosed table 1 there is shown an example of an auxiliary resource object class defined in the C++ program language.

The above described invention may be modified and varied within the scope of the attached claims.

TABLE 1

| | Comment: |
|---|---|
| {class Aux Analyze | ;object class name |
| attribute 1 ID | ;kind of device |
| attribute 2 State | ;state of class |
| (open/locked) | |
| . | |
| . | |
| . | |
| list Aux Pool ID | ;list with Aux Pool ID:s |
| ID$_{-1}$ | ;identifies different pools |
| ID$_{-2}$ | |
| . | |
| . | |
| . | |

TABLE 1-continued

| | Comment: |
|---|---|
| Method action Aus Pool Pool | ; triggers search of Aux |
| get Aux Pool | |
| set configuration of list of pool-ID:s | ;is made for each attribute |
| create instance | ;creates instance of the class |
| delete instance | ;deletes instance of the class |
| notification} | |

What is claimed is:

1. A generic information model for configuration, control and management of auxiliary resources within a telecommunication network, said information model comprising a hierarchical structure of object classes, each object class comprising an aggregate of named data elements and a set of operations designed to manipulate said data, said hierarchical structure comprising in a top down direction: a network object class (25), a managed element object class (26) having a relation to the network object class, and a fabric object class (27) having a relation to the managed element object class, said network object class (25) representing an abstraction of the telecommunication network and comprising an identification of the telecommunication network, said managed element object class (26) describing the physical sites of fabrics (38, 40, 48) within said network, said fabric object class (27) describing the physical exchanges used for switching in said telecommunication network as well as devices connected to individual switches, characterized in that the information model is used for a switched telecommunication network and that it further comprises an auxiliary resource analyze object class (28), an auxiliary resource pool object class (29) and an auxiliary resource connection termination point object class (30) said auxiliary resource analyze object class (28) comprising information describing the cites within said telecommunication network where there are pools (21, 27) of auxiliary devices and a relation to said network object class (25), said auxiliary resource pool object class (a) having a relation to said fabric object class (27), (b) comprising identities of specific auxiliary devices and (c) containing connection termination points of said auxiliary devices, said auxiliary resource connection termination point object class a) having a relation to said managed element object class,
    (b) containing information on identified auxiliary devices and (c) operating on identified auxiliary devices so as to allow for centralized handling of resources within said telecommunication network.

2. A method of handling auxiliary resources in a telecommunication network using a generic information model, said telecommunication network comprising exchanges, auxiliary devices connected to the exchanges and trunks interconnecting the exchanges, said generic information model comprising a hierarchical structure of the following object classes:

(a) a network object class (25) representing an abstraction of the telecommunication network, (b) a managed element object class (26) with a relation to the network object class, said managed object class describing the physical sites of fabrics within the telecommunication network, (c) a fabric object class (27) with a relation to the managed element object class, said fabric object class describing said exchanges and devices, auxiliary devices included, connected thereto, (d) an auxiliary resource analyze object class (28) with a relation to said network object class, said auxiliary resource analyze object class comprising information describing the sites within said telecommunication network where there are pools of auxiliary resources, (e) an auxiliary resource pool object class (29) with a relation to the network object class, said auxiliary resource pool object class comprising identities of specific auxiliary devices as well as connection termination points of said auxiliary devices, (f) an auxiliary resource connection termination point object class (30) with a relation to said managed element object class, said auxiliary resource connection termination point object class comprising information on identified auxiliary devices and operating on identified auxiliary devices, each one of said object classes comprising an aggregate of named data elements and a set of operations designed to manipulate said data, said method comprising the following steps (1) a telecommunication application sending to said auxiliary resource analyze object class (28) a request to seize an auxiliary device of an identified type, (2) said auxiliary resource analyze object class in response to said request returning to said telecommunication application the physical site of a pool of devices of the requested type, (3) said telecommunication application seizing in said auxiliary resource pool object class (29) a free auxiliary device and receiving therefrom a connection termination point of said seized auxiliary device, (4) said telecommunication application ordering connection set up application software (58) to set up a connection for which the requested auxiliary device was requested and to connect said seized auxiliary device to said connection.

3. A method in accordance with claim 2, characterized by disconnecting said seized auxiliary device when there is no longer any need for it and returning it to said identified pool.

* * * * *